US009342186B2

(12) United States Patent
Forti et al.

(10) Patent No.: US 9,342,186 B2
(45) Date of Patent: May 17, 2016

(54) SYSTEMS AND METHODS OF USING INTERACTIVE DEVICES FOR INTERACTING WITH A TOUCH-SENSITIVE ELECTRONIC DISPLAY

(76) Inventors: William Mark Forti, Claremont, CA (US); Blake English, Claremont, CA (US)

( * ) Notice: Subject to any disclaimer, the term of this patent is extended or adjusted under 35 U.S.C. 154(b) by 18 days.

(21) Appl. No.: 14/117,798

(22) PCT Filed: May 17, 2012

(86) PCT No.: PCT/US2012/038366
§ 371 (c)(1),
(2), (4) Date: Mar. 26, 2014

(87) PCT Pub. No.: WO2012/162090
PCT Pub. Date: Nov. 29, 2012

(65) Prior Publication Data
US 2015/0042619 A1    Feb. 12, 2015

Related U.S. Application Data

(60) Provisional application No. 61/561,464, filed on Nov. 18, 2011, provisional application No. 61/488,581, filed on May 20, 2011.

(51) Int. Cl.
| G06F 3/042 | (2006.01) |
| G06F 3/048 | (2013.01) |
| A63F 13/20 | (2014.01) |
| A63F 13/40 | (2014.01) |
| A63F 3/00 | (2006.01) |
| G06F 3/0488 | (2013.01) |
| A63F 7/06 | (2006.01) |

(52) U.S. Cl.
CPC .......... *G06F 3/042* (2013.01); *A63F 3/00643* (2013.01); *A63F 13/06* (2013.01); *A63F 13/10* (2013.01); *G06F 3/0488* (2013.01); *A63F 7/0628* (2013.01); *A63F 2003/00659* (2013.01); *A63F 2300/1075* (2013.01); *A63F 2300/6045* (2013.01)

(58) Field of Classification Search
None
See application file for complete search history.

(56) References Cited

U.S. PATENT DOCUMENTS

| 6,773,344 B1 | 8/2004 | Gabai et al. |
| 7,397,464 B1 | 7/2008 | Robbins et al. |
| 7,602,381 B2 | 10/2009 | Aiken et al. |
| 7,683,883 B2 | 3/2010 | Touma et al. |
| 7,934,656 B2 | 5/2011 | Silverbrook et al. |
| 8,092,287 B2 | 1/2012 | Purvis et al. |

(Continued)

OTHER PUBLICATIONS

YouTube.com video, Dora Let's Play Backpack Due for iPad, published Aug. 9, 2012.

*Primary Examiner* — Ryan A Lubit
(74) *Attorney, Agent, or Firm* — Fish & Tsang LLP (57) ABSTRACT

An interactive device for interacting with a touch-sensitive electronic display is contemplated. In some embodiments, the interactive device includes a registration module that is configured to generate a touch-based registration signal perceptible to the touch-sensitive display. The registration module is coupled to an optical sensor that is configured to receive a communication from the display. The interactive device also includes a configuration module that configures the interactive device to be responsive to the content that is displayed on the touch-sensitive display based on at least one of the registration signal and the communication received from the display.

19 Claims, 5 Drawing Sheets

(56) References Cited

U.S. PATENT DOCUMENTS

| | | | |
|---|---|---|---|
| 2005/0245302 A1* | 11/2005 | Bathiche | A63F 13/00 463/1 |
| 2006/0223637 A1 | 10/2006 | Rosenberg | |
| 2007/0257906 A1 | 11/2007 | Shimura et al. | |
| 2008/0081694 A1 | 4/2008 | Hong et al. | |
| 2010/0144413 A1 | 6/2010 | Purvis et al. | |
| 2010/0268359 A1 | 10/2010 | Prestenback et al. | |
| 2011/0028219 A1 | 2/2011 | Heatherly et al. | |
| 2011/0148604 A1 | 6/2011 | Miller | |
| 2012/0007808 A1* | 1/2012 | Heatherly | A63F 13/02 345/173 |
| 2012/0007817 A1 | 1/2012 | Heatherly et al. | |
| 2012/0062490 A1* | 3/2012 | Heatherly | A63F 13/02 345/173 |
| 2012/0194457 A1* | 8/2012 | Cannon | A63F 13/02 345/173 |
| 2013/0314313 A1* | 11/2013 | Ericson | G06F 3/0317 345/156 |

* cited by examiner

SYSTEMS AND METHODS OF USING INTERACTIVE DEVICES FOR INTERACTING WITH A TOUCH-SENSITIVE ELECTRONIC DISPLAY

This application claims the benefit of U.S. provisional application No. 61/488,581, filed May 20, 2011, and U.S. provisional application No. 61/561,464, filed Nov. 18, 2011, incorporated herein by reference in their entirety.

FIELD OF THE INVENTION

The field of the invention is toys, and particularly electronic toys for use with tablet computing devices.

BACKGROUND

Tablet computing devices, such as the Apple® iPad™, Blackberry® PlayBook™, Samsung® Galaxy Tab™, Acer® Iconia™, Google® Nexus Tablet™, HP® TouchPad™, HP® Slate Tablet™, etc, have gained enormous popularity among consumers. These tablet devices allow for new ways of interacting with the users using their touch-sensitive displays. As a result, many applications (e.g., game applications) that allow users and/or objects (e.g., toys) to interact with the display of the tablet device have been developed. In addition, electronic toys have been made to integrate the toys with the display activities of the devices (see e.g., U.S. Pat. Nos. 6,773,344B1, 7,397,464B1, US20060223637A1, US20080081694A1, US20100268359A1, or US2011/0304651). In even more sophisticated efforts, toy objects can be used as input devices to drive display activity as seen in http://www.youtube.com/watch?v=tFEUNGyHbW4, http://www.youtube.com/watch?v=UDi_TsDAQC8, http://www.youtube.com/watch?v=72xvyt Ag_UM, and http://www.youtube.com/watch?v=TJavxo4bSh4. Another example of such toys is seen on http://www.engadget.com/2011/09/27/disney-appmates-cars-toys-mean-parents-may-never-see-their-ipa/. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

While such attempts are fairly entertaining, significant processing power and specialized equipment is typically required, resulting in expensive devices. Moreover, the general population will not be able to add to these highly engineered toys. Thus, there is still a need for improved electronic entertainment devices, and especially low-cost toys for which playing platforms can be readily built.

SUMMARY OF THE INVENTION

The inventive subject matter relates to an interactive device (e.g., a toy object) that is configurable to interact with another electronic device (e.g., a tablet computing device) that includes a touch-sensitive display. Specifically, the interactive device in some embodiments is responsive to the content that is displayed on the touch-sensitive display of the electronic device. Instead of or in addition to being responsive to the displayed content, the interactive device interacts with the touch-sensitive display to affect the displayed content, preferably while the user interacts with the device to further affect the displayed content.

In one preferred aspect of the inventive subject matter, an interactive device for interacting with a touch-sensitive electronic display is contemplated. In some embodiments, the interactive device includes a registration module that is configured to generate a touch-based registration signal perceptible to the touch-sensitive display. The registration module is coupled to an optical sensor that is configured to receive a communication from the display. The interactive device also includes a configuration module that configures the interactive device to be responsive to the content that is displayed on the touch-sensitive display based on at least one of the registration signal and the communication received from the display.

In another aspect of the inventive subject matter, an interactive device for interacting with a different electronic device having a display is contemplated. In some embodiments, the interactive device includes a registration module that is configured to generate a registration signal perceptible to the electronic device. The interactive device also includes an optical sensor that is configured to receive a communication from the display. Preferably, the optical sensor is coupled with a configuration module that configures the device to be responsive to the content that is displayed on the display based on the registration signal and the communication.

Alternatively, it is also contemplated a method of a device interacting with a touch-sensitive electronic display. In some embodiments, the method generates, via a registration module, a touch-based registration signal perceptible to the touch-sensitive display. The method receives, via a optical sensor, a communication from the display. The method then configures, via a configuration module, the device to be responsive to displayed content on the display based on at least one of the registration signal and the communication.

In some embodiments, the registration signal that is generated by the registration module of the interactive device indicates some information about the interactive device. For example, the registration signal may indicate one or more of the following information about the interactive device: the position of the interactive device relative to the display, the orientation of the interactive device relative to the display, the state of the interactive device, the device type, the device make, the device model, one or more of the device features, the device memory capacity, the interface type, one or more capabilities of the device, the revision number, the identity of the device's owner, an alert, an alarm, and a transaction.

As mentioned above, the registration module of the interactive device generates a touch-based registration signal that is perceptible to the display. Instead of or in addition to the touch-based registration signal, the registration module generates a registration signal that involves non-touch modalities. Some examples of the non-touch modalities include an audio modality, a visual modality, a kinesthetic modality, a vibration modality, a temperature modality, and a magnetic modality.

In some embodiments, the interactive device generates multiple registration signals that are perceptible to the display. In these embodiments, the multiple registration signals are simultaneous registration signals, multiple time-based registration signals, or multiple location based registration signals. In addition, the interactive device of some embodiments includes multiple registration modules to generate the multiple registration signals.

As mentioned, the interactive device receives a communication from the display through the optical sensor. In some embodiments, the communication includes a set of optical communication. Instead of or in addition to the optical communication, the interactive device can be configured to receive communication in other non-optical modalities such as an audio modality, a touch modality, a kinesthetic modality, a vibration modality, a temperature modality, and a magnetic modality. In some of these embodiments, the interactive device includes multiple optical sensors to receive communication from different locations on the display.

In some embodiments, the optical sensor includes one of the following: a camera, a charge-coupled device (CCD) sensor, a complementary metal-oxide-semiconductor (CMOS) sensor, a solar cell, a photo-resistor, a phosphorescent sensor, a fluorescent sensor, and a scintillator. Also in some embodiments, the registration module comprises the optical sensor.

As mentioned, the configuration module of the interactive device configures the device to be responsive to displayed content on the display. In some embodiments, the configuration module further configures the interactive device to take an action based on the displayed content. In some embodiments, the configuration module configures the interactive device to take at least one of the following actions: an actuation, generating a signal, triggering a mechanic actuator, transacting with another device, communicating with another device, and generating a user interface.

In some embodiments, the displayed content includes at least one of the following: a pixel pattern, a color, a symbol, an object, a temporal display pattern, a pixel location, a set of unlit pixels, and polarization. In addition, the displayed content includes at least one of the following contents: game content, educational content, medical content, reference content, and advertising content.

In a preferred embodiment, the interactive device includes a housing in which the registration module, the optical sensor, and the configuration module are disposed. In some embodiments, the housing of the interactive device is shaped as a toy, while the housing of the interactive device in some other embodiments is shaped like an educational tool, a medical tool, a construction tool, a weapon, an appliance, or a smart phone.

In some embodiments, the display that interacts with the interactive device is a portion of an electronic device such as smart phone, a tablet, a computer, a kiosk, an interactive surface, a game console, an appliance, or an interactive advertisement.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to tablet computers, servers, services, interfaces, portals, platforms, or other systems formed from computing devices, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including allowing a physical device to interact with a computer application through the display of the computer.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

According to some aspects of the present invention, an interactive device (e.g., a toy object) that is configurable to interact with another electronic device (e.g., a tablet computing device) having a touch-sensitive display is presented. Specifically, the interactive device is responsive to the content that is displayed on the display portion of the electronic device. Instead of or in addition to being responsive to the displayed content, the interactive device interacts with the touch-sensitive display to affect the displayed content, preferably while the user interacts with the device to further affect the displayed content.

It should be appreciated that traditional touch-sensitive displays are transformed into a control surface for an object (e.g., a toy) that interacts with the display surface. Known electronic devices (e.g., tablet computers), and software applications for the devices, typically require a user to control the object (e.g., moving the object around the touch-sensitive display) in order to interact with the display of the electronic devices. Using the inventive concept illustrated herein, it is therefore contemplated that the interactive device is responsive to the content that is displayed on the display without interference by the user. In other words, the interactive device is triggered to perform an action solely by the displayed content without additional inputs by the user.

It should be noted that the term 'tablet computer' as used herein generally refers to a computing device having a display portion that is typically (but not necessarily) sensitive to touch. Therefore, the term 'tablet computer' includes, but not limited to, laptop computers, smart phones, and other display-only devices receiving a video input via wired or wireless connections. Examples of tablet computers are Apple® iPhone™, Apple® iPad™, Blackberry® PlayBook™, Samsung® Galaxy Tab™, Acer® Iconia™, Google® Nexus Tablet™, HP® TouchPad™, HP® Slate Tablet™, and Motorola® Xoom™, Microsoft® Surface™, Nintendo® DS™, PlayStation® Vita™, etc.

In one preferred aspect of the inventive subject matter, an interactive device for interacting with a touch-sensitive electronic display is contemplated. In some embodiments, the interactive device includes a registration module that is configured to generate a touch-based registration signal perceptible to the touch-sensitive display. The registration module is coupled to an optical sensor that is configured to receive a communication from the display. The interactive device also includes a configuration module that configures the interactive device to be responsive to the content that is displayed on the touch-sensitive display based on at least one of the registration signal and the communication received from the display.

In another aspect of the inventive subject matter, an interactive device for interacting with a different electronic device having a display is contemplated. In some embodiments, the interactive device includes a registration module that is configured to generate a registration signal perceptible to the electronic device. The interactive device also includes an optical sensor that is configured to receive a communication from the display. Preferably, the optical sensor is coupled with a configuration module that configures the device to be responsive to the content that is displayed on the display based on the registration signal and the communication.

Alternatively, it is also contemplated a method of a device interacting with a touch-sensitive electronic display. In some embodiments, the method generates, via a registration module, a touch-based registration signal perceptible to the touch-sensitive display. The method receives, via a optical sensor, a communication from the display. The method then configures, via a configuration module, the device to be responsive to displayed content on the display based on at least one of the registration signal and the communication.

Consequently, it should be appreciated that a physical 3-D object can be placed in contact with (or in close proximity to) a display screen and causes and/or reacts to events that are displayed on the display screen. Various examples and play options are provided below in more detail. With respect to suitable physical 3-D objects, it should be appreciated that the particular nature and configuration is not limiting so long as the object is responsive to events on the display and/or can provide feedback to the display.

Figure 1:
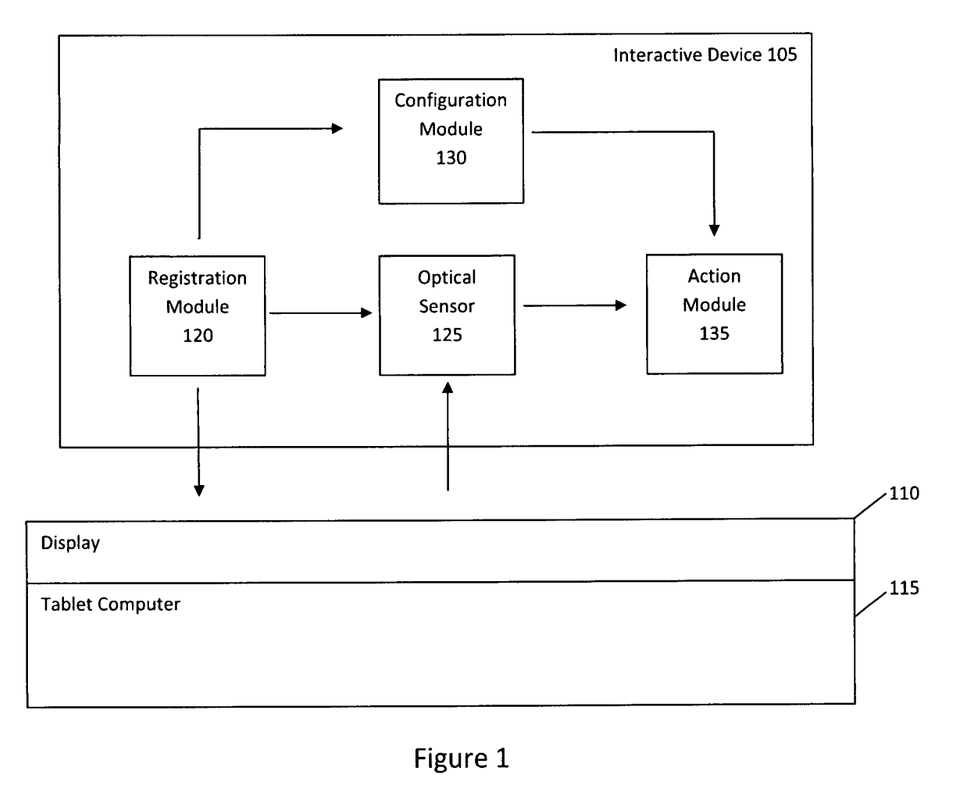
FIG. 1 conceptually illustrates an interactive device of some embodiments.

FIG. 1 illustrates an example of the interactive device of some embodiments. As shown in FIG. 1, interactive device 105 includes a registration module 120, an optical sensor 125, a configuration module 130, and an action module 135. When the interactive device 105 is placed on top of (or near) display 110 of another electronic device 115, registration module 120 of the interactive device 105 generates a registration signal and sends the registration signal to electronic device 115 through the display 110. In some embodiments, the electronic device 115 is a tablet computer and the display 110 is a touch-sensitive display screen 110.

A touch-sensitive display screen is an electronic display that can detect the presence and the location of a touch of the display. Different techniques can be used to implement the touch-sensitive display. In some embodiments, the touch-sensitive display includes two electrically-resistive layers separated by a thin space. A voltage is sent through one of the layers and sensed at the other layer. Thus, when an object (e.g., a fingertip, a stylus tip, etc.) presses down on the outer layer, the two layers connect at a particular location, and allow the position of the contact point to be detected. In other embodiments, the touch-sensitive display includes an insulator (e.g., glass) that is coated with a transparent conductor such as indium tin oxide. When another electrical conductor such as human body or other conductive object touches the surface of the display, the display's electrostatic field is distorted that is measurable as a change of capacitance. In addition, other technologies such as surface acoustic wave, infrared, etc. may also be used to implement the touch-sensitive display.

Different embodiments of the interactive device use different techniques to generate the registration signal. For instance, the interactive device of some embodiments uses a conductive base to create a distortion on the display's electrostatic field when the conductive base is in contact with the touch sensitive display screen. In other embodiments, the interactive device simply provides a base for contacting different locations on the surface of the touch-sensitive display. In this manner, the interactive device 105 communicates the position of the interactive device with respect to the display by sending the registration signal at a particular location on the display.

In addition to the position of the interactive device, the device of some embodiments send multiple signals at the same location or at different locations of the display (e.g., generating a spatial and/or temporal pattern of registration signals by concurrently or iteratively sending the registration signals at different locations on the display, or by sending multiple time-based registration signals to indicate a particular temporal pattern) to indicate other information about the interactive device to the display. Examples of these other information include, but not limited to, the orientation of the interactive device relative to the display, the state of the interactive device, the device type, the device make, the device model, one or more of the device features, the device memory capacity, the interface type, one or more capabilities of the device, the revision number, the identity of the device's owner, an alert, an alarm, and a transaction. In some embodiments, the interactive device 105 uses a single registration module to generate the multiple registration signals while the interactive device 105 of some other embodiments include more than one registration module to generate the multiple registration signals to the display.

In some embodiments, the registration signal that is generated by the registration module 120 is a touch-based registration signal. For example, the registration module 120 may generate a current, a magnetic field, etc., or simply providing a contact, at a particular location on the touch-sensitive display 110. Instead of or in addition to the touch-based registration signal, the registration module 120 may generate a registration signal that involves non-touch modalities. Some examples of the non-touch modalities include an audio modality, a visual modality, a kinesthetic modality, a vibration modality, a temperature modality, or a magnetic modality.

After generating one or more registration signals to the display 110 of the electronic device 115, the registration module 120 sends a signal to the optical sensor 125. In some embodiments, the registration module 120 sends the signal to the optical sensor 125 only after the registration module 120 receives an acknowledgment (e.g., in a form of an acknowledgment signal) from the electronic device 115.

Upon receiving the signal from the registration module 120, the optical sensor 125 of the interactive device 105 begins to receive communications from the display 110. Different embodiments of the interactive device include different types of optical sensor. For instance, the optical sensor 125 may be any one of the following: a camera, a charge-coupled device (CCD) sensor, a complementary metal-oxide-semiconductor (CMOS) sensor, a solar cell, a photo-resistor, a phosphorescent sensor, a fluorescent sensor, or a scintillator.

In a preferred embodiment, the optical sensor is located on the side of the device that is closest to the display in order to efficiently detect light and changes in light on the display. In some embodiments, the optical sensor is smaller than the size of the display and thus only detects lights and changes of lights from only a portion of the display.

In some embodiments, the optical sensor 125 is a module separate from the registration module 120, while in other embodiments, the optical sensor 125 is part of the registration module 120. In addition, the interactive device 105 of some embodiments includes more than one optical sensor for receiving optical communication from different locations of the display 110. Upon receiving the communications from the display 110, the optical sensor 120 sends the received communications to the action module 135.

After generating one or more registration signals, the registration module 120 of some embodiments also sends a signal to the configuration module 130 after sending the registration signal to the display 110. Upon receiving the signal from the registration module 120, the configuration module 130 configures the action module 135 of the interactive device 105 to be responsive to the content that is displayed on the display. Thus, the interactive device of some embodiments is configured to react to the events in the virtual world displayed on the display. In some embodiments, the configuration module 130 configures the action module 135 to take a certain action in response to the content (or communications) that is received by the interactive device 105 through the optical sensor 120. For example, the configuration module 130 of some embodiments configures the action module 135 to perform one of the following actions based on the received content: vibrating, jumping, rolling over, standing up, changing shape, triggering a mechanical actuator within the interactive device 130, providing an output (e.g., a light, a display of a message, etc.), and generating a communication with another device. It should be apparent to those skilled in the art that this list of action items is not exhaustive and the action module can be configured to perform many other actions based on the received content.

In some embodiments, the configuration module 130 configures the action module 135 to perform the action only when a particular content is received through the optical sensor 125. For example, the action module 135 of some embodiments is configured to perform the action only when a particular pixel pattern, a particular color, a particular symbol, a particular object, a particular temporal display pattern, a particular pixel location, a particular set of unlit pixels, a particular intensity of light, or a particular polarization is received. Those who is skilled in the art would appreciate that the particular displayed content can fall within the spectral range of visible light or beyond the spectral range of visible light, such as infrared light and ultraviolet light. In these embodiments, the display would generate an image of which a portion includes light emitting elements in the non-visible range to so produce an entire high resolution frame of metadata. Furthermore, the configuration module 130 of some embodiments configures the action module 135 to perform different actions when different contents are received.

Instead of or in addition to reacting to the optical content that is displayed on the display 110, the interactive device 105 of some embodiments is configured to react to other types of inputs, such as sound, motion, radio (e.g., Bluetooth, 802.11, etc.). In these embodiments, the interactive device 105 includes other types of sensors or receivers, such as an audio receiver, a motion sensor, etc., (not shown in FIG. 1) for receiving communications that are in other non-optical modalities. Examples of these other non-optical modalities include an audio modality, a touch modality, a kinesthetic modality, a vibration modality, a temperature modality, and a magnetic modality.

It should be appreciated by those skilled in the art that the interactive device can also communicate information or instructions back to the device at any time. The communication can be conducted through the conductive base(s) of the device and the touch sensitive display screen or any other method listed above (e.g., Bluetooth, 802.11, sound, Zigbee, wireless USB, near field communication, radio frequency identification technology etc.).

It is also contemplated that the interactive device of some embodiments includes an array of sensors such that a larger amount of information/instructions can be sent from the display to the interactive device. In this manner, it is possible to send data such as emails, sound bytes, or instructions for more complicated actions to the interactive device. As a result, the interactive device can be instructed to perform complicated actions. For example, a small model person could dance and/or sing on the display where the dance moves and songs are dynamically transmitted to the interactive device through the display. A robotic arm built into the interactive device could also be controlled in this way. In addition, the user can further remotely control an interactive device that is placed on a tablet computer's display by remotely controlling the tablet computer via Bluetooth, WiFi, or cellular data.

Figure 2:
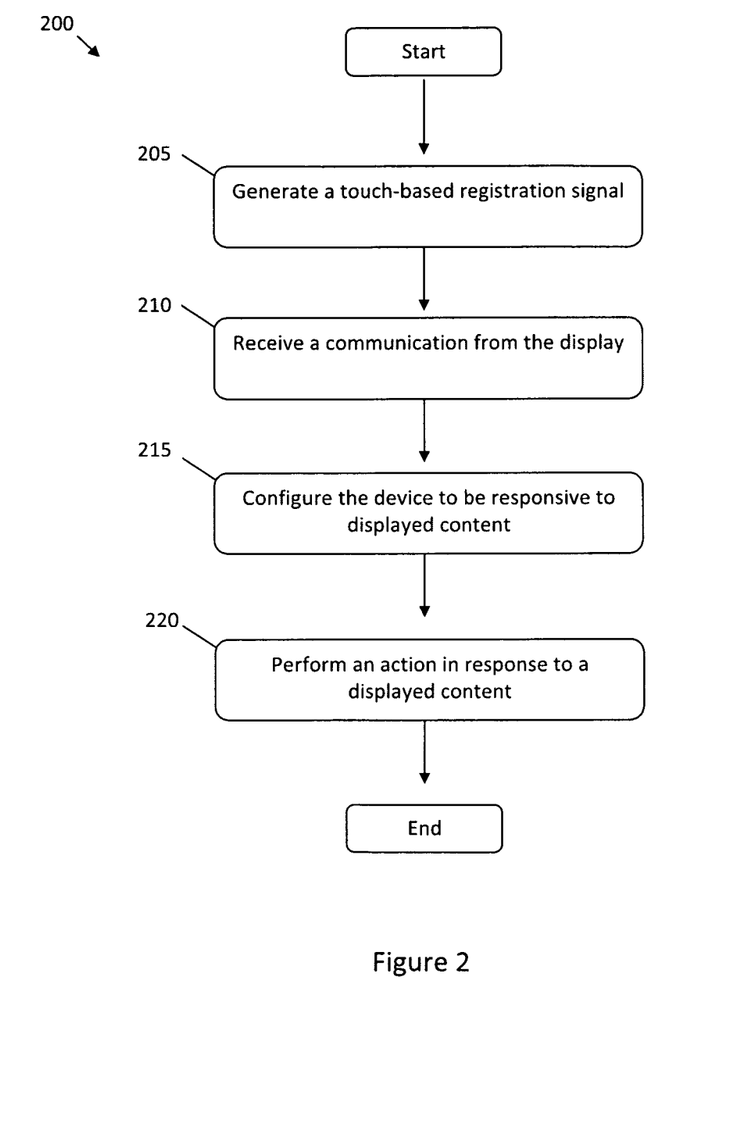
FIG. 2 conceptually illustrates a process of an interactive device interacting with an electronic display.

FIG. 2 conceptually illustrates a process 200 of an interactive device interacting with an electronic display. In some embodiments, the process is performed by the interactive device 105 of FIG. 1. The process begins by generating (at 205) a touch-based registration signal. In some embodiments, the touch-based registration signal is generated by the registration module 120 of the interactive device 105. The registration signal is received by the electronic display to register the interactive device with the electronic display in order to begin the interaction between the interactive device and the electronic display.

The process then receives (at 210) a communication from the display. In some embodiments, the communication is received by the optical sensor 125 of the interactive device 105. Next, the process configures (at 215) the interactive device to be responsive to displayed content on the display. In some embodiments, the configuration is performed by the configuration module 130 of the interactive device 105. As mentioned above, the configuration module of some embodiments configures the action module of the interactive device to take an action based on a particular content that is displayed on the display. In some embodiments, the content is received at the interactive device 105 through the optical sensor 125.

The process then performs (at 220) an action when a particular displayed content is detected. As mentioned, the action module of some embodiments is configured to perform a certain action when a particular displayed content is detected. Then the process ends.

In another preferred aspect of the inventive subject matter, software in various formats is therefore contemplated to allow operation of the interactive device and the tablet computer as described herein. It should be noted that the software contemplated herein is typically stored in a non-transitory medium (e.g., computer hard drive, DVD, memory element, flash memory, etc.) and that the software can be transferred from one computing device to another. Therefore, in one especially preferred aspect, the software is configured as a downloadable app (e.g., app from iTunes).

It is generally contemplated that the software contemplated herein will typically reside on the interactive device and/or the tablet computer, and will be operable as a stand-alone software. However, it should also be appreciated that the interactive device may also independently operate software that may be only responsive to signals from the tablet computer (or other signal source, including audio, RF, or optical) or that the software in the interactive device may be interactive with the software operating in the tablet computer.

In one typical example, the software of the tablet computer will produce a video output on the tablet computer to so deliver a visual playground for the interactive device. Most typically, the software is programmed to integrate signals from the gyroscopic or accelerometric sensors and will adjust the display in response to such signals. Additionally, or alternatively, the software may also be responsive to input from other sources, including an audio source (especially including voice), an RF source, an IR source, and/or touch. In less preferred aspects, the software is not responsive to external signals. Therefore, it should be appreciated that the software may be employed to enhance the experience by allowing the user to modify the display content to at least some degree by interacting with the display and/or table computer.

Similarly, where software is also executed in the interactive device, it should be noted that the software may produce a preprogrammed action in the interactive device, either in response to display content, and/or in response to a non-display signal. Consequently, the software in the toy may be responsive to the display and/or user input. Most typically, where the interactive device executes software, the software is hard coded into a chip. Alternatively, the software may also be uploaded via wired USB port, wireless protocol, or taught by the user.

For example, where the software is a car racing game application for a tablet computer, the software executes a program to display a race track on the tablet computer's display screen. Once an interactive device (e.g., an interactive device that is shaped like a race car) is positioned on the touch sensitive display, the race track will then proceed to move to simulate the race car driving on the track. Sounds may be used to enhance the experience. In some embodiments, the displayed track may be further modified by the user tilting the display, or the tilt may be used to generate specific sound effects (e.g., screeching tires). Once the light sensor of the toy passes over a specific pixel pattern, the race car may be programmed to execute an action (e.g., release of a spring-loaded mechanism, blinking headlights, etc.), and/or may provide a signal (e.g., via Bluetooth) to the tablet computer to interact with the software of the tablet computer (e.g., to generate a visual effect associated with the toy position, or to produce a sound effect).

Consequently, the software on the tablet computer may be programmed to be responsive to user input via one or more sensors of the tablet computer and/or input from the race car via positioning of the race car and/or signals provided by the race car. Additionally, the software in the tablet computer may also be programmed to be responsive to direct user input (e.g., via voice control).

Use Cases of the Interactive Device

Figure 3:
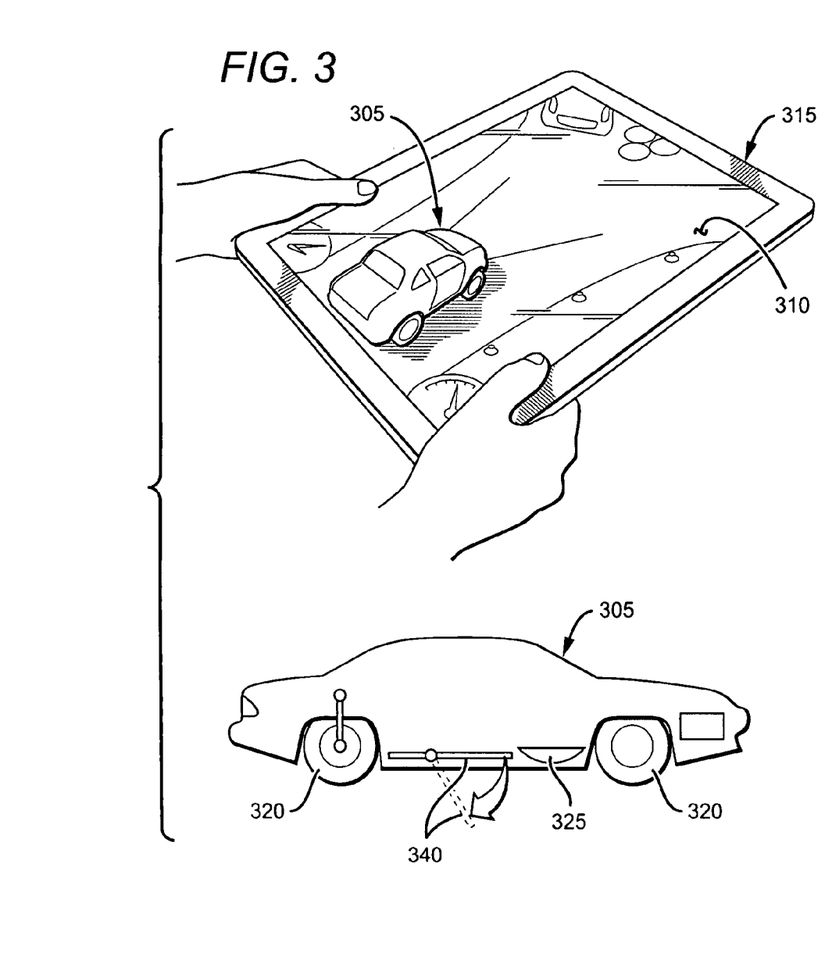
FIG. 3 illustrates an example electronic toy interacting with a tablet computer of some embodiments.

The Race Car (1): FIG. 3 illustrates one example embodiment of an interactive device. As shown, an interactive device 305 that is shaped as a toy car is located on top of a touch sensitive display 310 of a tablet computer 315. The tablet computer 315 includes software instructions stored in memory that when executed runs a race car game application. As shown, the tablet computer 315 displays a scene of the race car game application on the display 310 that includes virtual race track and virtual obstacles.

FIG. 3 also shows that the toy race car 305 has an optical sensor 325 that is located on the undercarriage of the toy car for receiving optical communications/inputs from the display 310. Thus, the race car game application can communicate with the interactive device by providing light/pixel patterns at a location of the display 310 below the optical sensor 325 of the toy race car 305. The toy race car 305 also includes four wheels 320. At least one or more of the wheels 320 includes a conductive base for generating signals to the touch-sensitive display 310. The signals indicate the location and orientation, among other things, about the toy race car 305 to the display 315. In addition, the interactive device 305 includes a small arm 340 attached to a motor that makes the toy race car "jump" when the motor is triggered.

Figure 4:
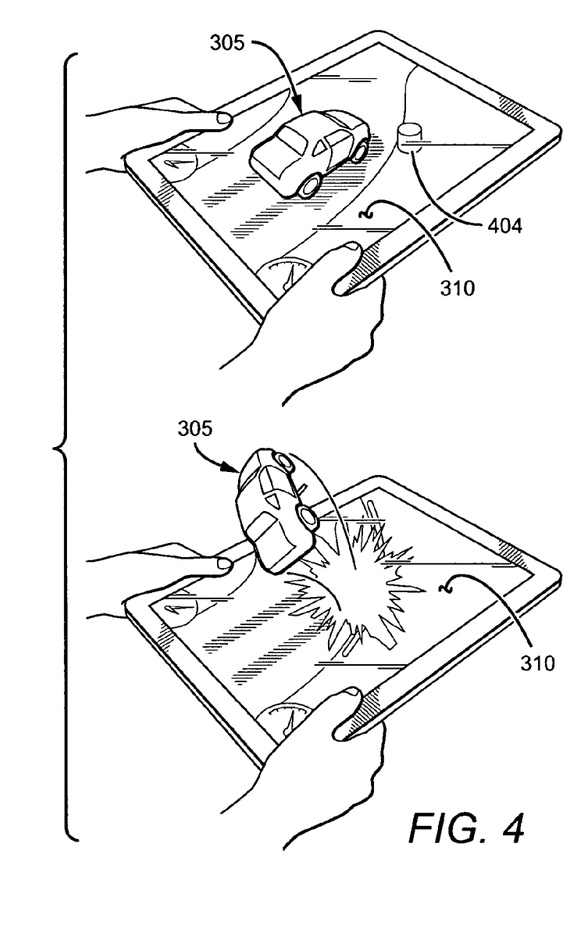
FIG. 4 illustrates different example interactions between an electronic toy and a tablet computer.

FIG. 4 shows another view of the toy race car 305 interacting with the tablet computer 315. As shown, the user can "drive" or control the toy race car in the virtual track of the race car game application by tilting the display 310. The virtual race track scrolls by on the display 310. FIG. 4 also shows that if the user drives the toy race car off the virtual road, or hit a virtual obstacle (such as virtual obstacle 404), the race car game application will instruct the tablet computer 315 to display a particular pixel/light pattern on the display 310 that is detectable by the optical sensor 325 of the toy race car. Upon detecting the particular pixel/light pattern on the display 310, the toy race car 305 triggers the motor to make the toy race car "jump". Additionally or alternatively, the toy race car includes other mechanical parts that would make the car to perform other actions (e.g., fold in half, slide, rotate, etc.) upon the occurrence of some other events in the virtual world of the race car game. For example, the toy race car 305 of some embodiments is configured to flip over or jump off the tablet computer entirely in a fiery explosion if the toy race car hit too many of these virtual bumps, or crash badly. In some other embodiments, the chassis of the toy race car decouples when crashed in the virtual world of the race car game, and by pushing down the chassis to its original position, the toy race car could reset the stored energy component. In yet some other embodiments, the toy race car includes a hinge and weight to "fishtail" when the user tilts the tablet. In some embodiments, the toy race car includes flashing lights (i.e., a toy police car) when chasing a virtual "bad guy". The tablet computer 315 provides the siren sound effects.

In the above example, when the race car crashes in the virtual world, the toy race car is triggered to fly off the display or to fold in half. In this case, the user must "fix" the car (put the car back to its original configuration) in order to play the race car game again. In some embodiments, this "fixing" comprises resetting the spring or rubber band that stores the energy needed to fling the car off the screen. Instead of, or in addition to the above, the "destruction" of the race car could take place slowly as the race car is damaged bit by bit by minor crashes in the virtual world.

In addition, because more information (instead of just an on/off signal) can be transmitted to the toy race car, the race car application, can transmit different signal for different event occurred in the virtual world. For example, when the race car is braking in the virtual world, the race car application can send a braking signal to the toy race car to trigger the toy race car to turn on the tail-lights. In some embodiments in which the toy race car includes other components (e.g., a set of speakers, an actuators, etc.), the race car application can trigger the toy race car to produce other action (e.g., different sound, different movement).

The Race Car (2): Similar to the example illustrated in The Race Car (1), except that the wheels (or the area that is in contact with the display 310) of the toy race car are made with very low friction material so that the toy race car actually slides around the display 310 when the display 310 is tilted. If the car hits a bump or crashes, the tablet displays a particular light/pixel pattern on the display 310. Upon detecting the particular light/pixel pattern, the toy race car 305 "crashes" in real life by turning over or being flung off the screen in a huge and epic explosion.

The Race Car (3): The toy race car has motors and wheels and will drive around the display screen, as commanded by the tablet through the interaction between the display of the tablet and the optical sensor of the toy race car. This could be an open loop system or a closed loop system with feedback provided by the conductive/capacitive pads.

The Race Car (4): The toy race car is coupled to a fishing line or Kevlar for pulling the car from one side to the other on the display of the tablet computer. The road scrolls by on the display. Everything else is similar to the examples illustrated above. This could be an open loop system where the barricades are displayed in a certain color. When the car hits a barricade, the car detects the barricade by the color and performs a certain action in response. Alternatively, it is a closed loop system where the tablet computer determines where the car is on the display. When the tablet computer determines that the car has hit a virtual obstacle, it displays a particular light/pixel pattern for the car to detect and react.

The "Moon Lander": In this example, the interactive device has a shape of the Apollo moon landing vehicle. The moon landing vehicle also has a light sensor in the bottom for detecting communication/displayed content from the display. The moon landing vehicle also has stored energy in the form of a spring or rubber band, or alternatively, a small battery, electric motor, and a microcontroller. At the start of this moon landing game application, the moon landing vehicle is placed in the center of the display.

The moon landing game application produces imagery on the display that simulates a perspective when one looks down from the top of the moon landing vehicle as it approaches the moon. To control the moon landing vehicle, the user tilts the tablet for rotational control and presses a virtual button for thrust control. When the user hits the thruster, the moon landing game application displays fire from the rocket engines on the display screen. The moon landing application also limits the amount of virtual fuel a user may use during each session such that the user has to land successfully on the lunar surface or at the moon base before the virtual fuel is used up. The user can also pick up more fuel via power-ups. If the fuel is run out, the game application displays the scenes to simulate the moon landing vehicle falling onto the moon surface.

When the moon landing vehicle hits the virtual moon surface with excessive velocity, the game application displays a large explosion on the screen, produces large noise. In addition, the toy moon landing vehicle is triggered through a displayed light/pixel pattern on the display to rocket off the screen and onto the floor. Specifically, at the moment of impact, the game application sends a visual signal to the moon landing vehicle's optical sensor to instruct the vehicle to jump/crash. The motor of the moon landing vehicle turns on and releases the stored energy, catapulting the vehicle off the display. If the user lands successfully, the game application produces a simulation on the display of lunar dust being blown away by the rocket engine. The user is able to re-fuel the vehicle and given another target destination, indicated by an arrow with distance.

Alternatively, a rescue helicopter game application can be designed using similar concept as the moon landing game, in which the moon landing vehicle is replaced by a rescue helicopter.

Figures 5, 6:
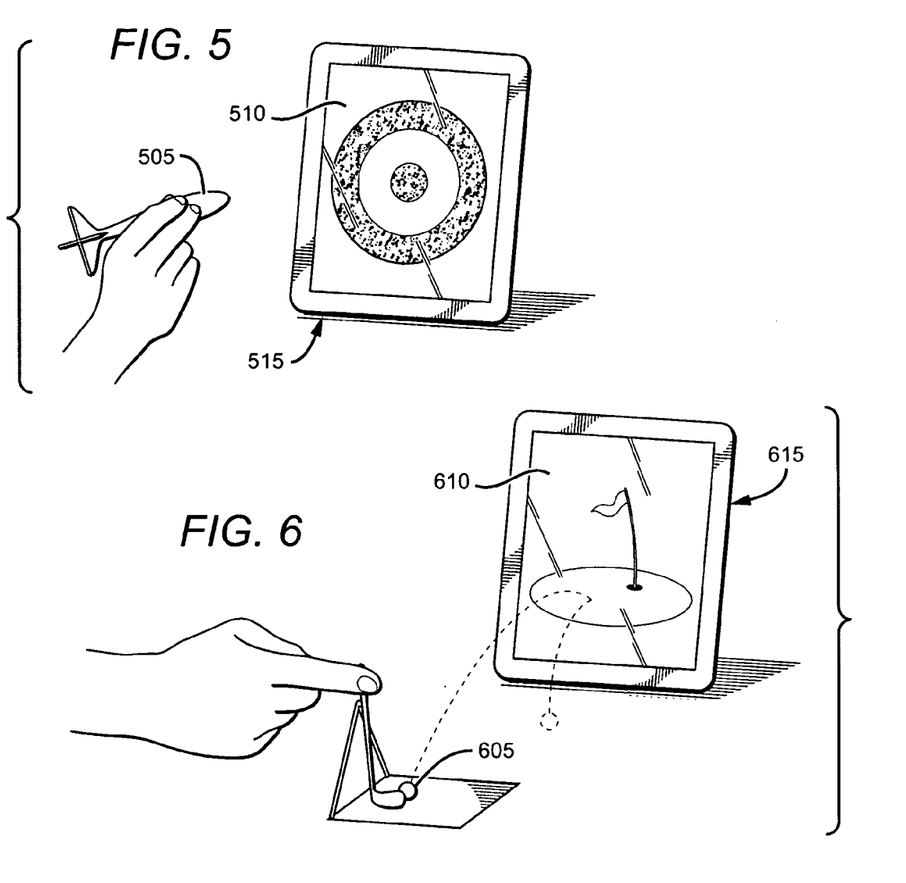
FIG. 5 illustrates another example electronic toy interacting with a tablet computer of some embodiments.
FIG. 6 illustrates another example electronic toy interacting with a tablet computer of some embodiments.

Dart Board: FIG. 5 illustrates an example dart board game application that runs on a tablet computer 515 and interacts with an interactive device 505 that is shaped as a dart. The dart 505 has a conductive base located at the tip of the dart 505. The tablet computer 515 is placed at a horizontal distance from the user with the display 510 facing the user. The user can throw the conductive darts 505 at the display that displays an imagery that simulates a dart board. As the dart 505 hits the display 510 (i.e., the conductive base of the dart 505 comes in contact with the display 510), the game application registers a hit. In addition, the game application can automatically compute the score. The game application also produces a cool ripple effect outwards from the impact point on the screen. The conductive dart 505 would stick or fall off. If the dart 505 is designed to fall off, the game application displays a virtual dart on the screen at the contact point.

Golf: FIG. 6 illustrates an example golf game application that runs on a tablet computer 615 and interacts with an interactive device 605 that is shaped as a golf ball. The golf ball 505 is preferably conductive to interact with the display 610. As shown, the user places a spring loaded club "launcher" on the edge of the display 610. The user may control the club launcher to send the golf ball 505 at the display 610. The ball is preferably tethered to the club launcher, but doesn't have to be. The golf ball is preferably sticky so it doesn't easily roll off the screen. The ball is preferably not round in shape for the same reasoning.

Figure 7:
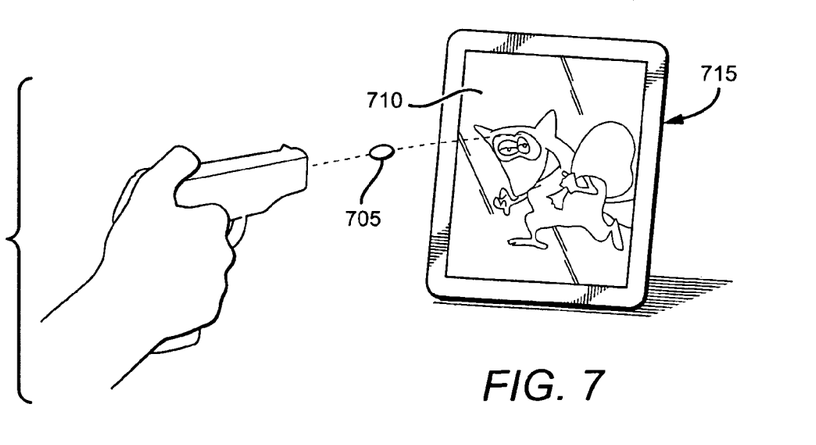
FIG. 7 illustrates another example electronic toy interacting with a tablet computer of some embodiments.

Shooting Game: FIG. 7 illustrates an example shooting game that runs on a tablet computer 715 and interacts with an interactive device 705 that is shaped as a pellet or a dart. The pellet or dart is preferably conductive to interact with the display 710. The user uses a gun that shoots a pellet at different virtual targets that are shown on the display. The user gets many of these pellets to shoot at the "virtual" moving targets or "virtual" stationary targets. These targets could be "virtual" people who can shoot back, dinosaurs, zombies, or metal targets.

Figure 8:
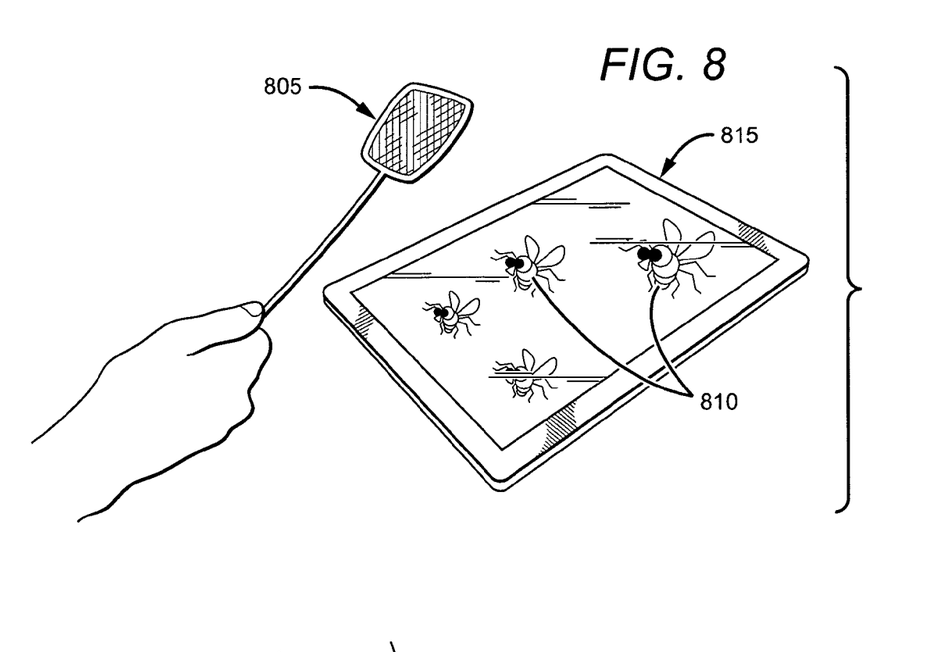
FIG. 8 illustrates another example electronic toy interacting with a tablet computer of some embodiments.

Fly Swatter: FIG. 8 illustrates an example fly swatting game application that runs on a tablet computer 815 and interacts with an interactive device 805 that is shaped as a fly. The fly 805 is placed at a location on the display 810 at the start of the game. The game application generates virtual flies on the display 810. The user uses a fly swatter (with the flat area being conductive to interact with the display 810) to hit the virtual flies on the display 801. The first two times the user successfully hits a virtual fly, the fly 805 bounces upwards (the game application generates a pixel/light pattern for the fly 805 to detect and trigger a movement, using the mechanism as described above). The third time the user successfully hits a virtual fly, the game application produces virtual blood and guts on the screen and the fly 805 careens off the tablet.

Figure 9:
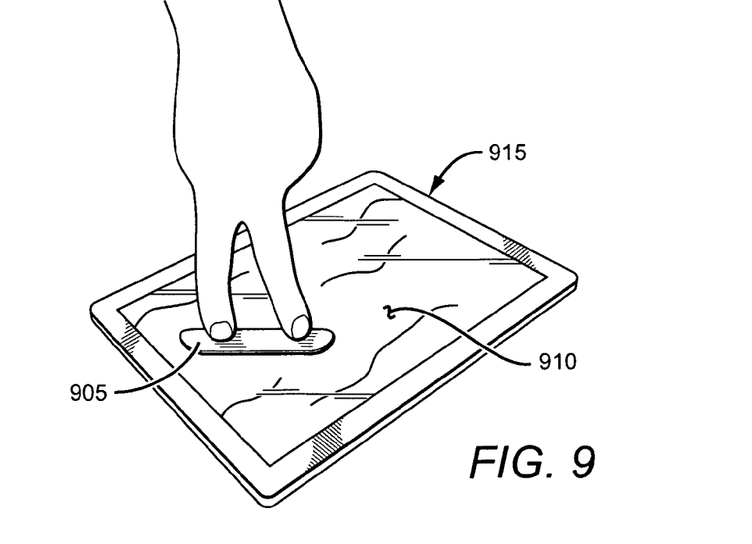
FIG. 9 illustrates another example electronic toy interacting with a tablet computer of some embodiments.

Skate Board: FIG. 9 illustrates an example skateboard game application. In this example, the interactive device 905 is shaped as a skateboard, a snowboard, or a surfboard. The skateboard is preferably conductive at the bottom to interact with the display 910. The user uses fingers to operate skate board to perform different tricks (e.g., a jump, a turn, etc.) at the appropriate time. The user must keep the board in contact with the display 910 or the user loses. The user also loses if the board crashes.

The Penguin: For this example penguin game application, a model penguin (i.e., the interactive device) is placed on the center of the display screen. In the virtual world created by the penguin game, the model penguin is on a slippery ice surface. The user guides/controls the penguin by tilting the tablet. If the penguin falls off the iceberg in the virtual world, the game application produces imagery that simulates the penguin being eaten by a killer whale with lot of blood being displayed on the screen. The penguin game application also uses the same techniques illustrated above to trigger the model penguin to jump off the screen. If the user wins, the game application would trigger the model penguin to flap its wings and produce "chirps" sound.

The snow-boarder: This snow-boarder game application combines the features of the race car and the penguin game application. The model snow-boarder is placed on the center of the display screen. When the snow-boarder goes over a bump or performs a jump in the virtual world created by the game, the game also uses similar techniques as illustrated above to trigger the model snow-boarder to jump also. If the snow-boarder crashes in the virtual world, the game also triggers the model snow-boarder to jump off the display. Those skilled in the art would appreciate that this game concept may apply to different games for a biker or a skier.

The flopping fish/Kayaker: This flopping fish game application interacts with a model fish (i.e., the interactive device). The user navigates the model fish through the virtual rapids created by the game application. If the model fish gets washed ashore or onto a sandbar in the virtual world, the flopping fish game triggers the model fish to flop all around on the display.

Frogs and Flies This frogs and flies game application interacts with a model frog (i.e., the interactive device). When the game is executed on a tablet computer, the model frog is placed at the edge of the display screen of the tablet computer. The game application produces imagery on the display that simulates an environment with many virtual flies for a frog to catch. The game application also detects the orientation and position of the model frog/frogs based on one or more conductive pads around the model frog's/frogs' base. The user controls how the model frog interacts with the game application. For example, when the user presses a button on the model frog, the game application creates a virtual tongue sticking out of the frog's mouth to catch virtual flies. If the virtual tongue hits a virtual fly. The virtual fly would disappear from the display screen with a "squeak" and 100 points would be displayed on the screen. This is done by having a conductive pad that touches the screens surface when the model frog's button is pressed down. Additionally or alternatively, the model frog can be designed in a way such that the model frog can be triggered by the content displayed on the display screen to open the model frog's mouth to catch virtual flies.

Gobble monster: In this example game application, small model robot (i.e., the interactive devices) chases a dot, insect or other prey around the screen and eats them.

Cute prey animal: The purpose of this cute prey animal game is to avoid having a cute prey animal that is represented by an interactive device that is shaped as a cute animal being eaten/killed in the virtual world created by the game. The user navigates the model animal in the virtual world by using different input methods provided by the tablet computer. If the model animal is killed in the virtual world, the game uses similar techniques as illustrated above to trigger the model animal to react.

Additionally, the cute prey animal game can be designed in a way such that the user has the ability to scare away virtual predators with other control input for the tablet computer (e.g., shaking the screen, etc). Furthermore, when there is a flood in the virtual world, the user builds a virtual sand castle around the model animal for protection. The game triggers the model animal to perform a certain action (e.g., flapping its wings) occasionally when the user has done a good job building the sand castle. If the animal "dies" in the virtual world, the game triggers the model animal to jump off the display screen or to tip over.

Hot Potato: This hot potato game application interacts with an interactive device that is shaped as a model potato guy. The model potato guy is put on the display screen. The user navigates the model potato guy through a landscape of frying pans and fire in the virtual world created by the game. If the potato guy hits a fire in the virtual world, the game triggers the model potato guy to bounce up and down and produce "Hot! Hot! Hot!" sounds. When the potato guy jumps into water, the game displays steam rising from the potato guy and triggers the model potato guy to produce a different sound such as "Ahhhhh."

Tarzan vs. Crocodiles: This Tarzan vs. Crocodiles game application is designed to interact with an interactive device that is shaped like a model Tarzan. The model Tarzan is attached to a model tree wine that is placed near the tablet computer. The user can swing the model Tarzan along the vine. Preferably, the model Tarzan includes conductive bases on the bottom of the model Tarzan's feet so that as the model Tarzan is being swung by the user over the display, the game application detects the location of the model Tarzan. The game application creates an imagery that simulates the Amazon rivers full of virtual crocodiles, piranhas, snakes, etc. swimming towards the bank to eat virtual Jane. The user time the Tarzan swing as to bonk the crocodile on the head making it turn upside down and sink to the bottom of the river.

Construction Zone: This construction zone game application interacts with one or more model dump trucks, cranes, front-loaders, backhoes etc. These model dump trucks, cranes, front-loaders, and backhoes are placed on or near the screen. The user controls the crane to lift an actual beam and place it properly on the screen where a virtual beam will appear. The player could build a virtual building, blast a tunnel, lay railroad tracks, pour concrete etc.

App Pets: A model pet, chicken, farm animal, monster, etc. could be put on the display screen. The app pets game application creates a virtual world on the display screen where the model pet could hunt and peck for food, drink, be fed by its real owner, get run over by a car, move around the display screen, squawk, flap, or jump depending on its mood. The model pet's action is triggered by the game application using similar techniques illustrated above.

Rocket Man: This rocket man game application creates a virtual environment in which a man with a jet pack is plummeting to the earth with clouds rushing by him. The ground seen from above is getting closer. He must veer from side to side to pick up at least 3 power pellets to turn his jetpack on and fly to a higher altitude. If he does not get the power pellets, he splats on the ground with a bounce and blood spurts everywhere. The game also triggers a model rocket man to bounce off the display screen.

It should be appreciated that in the example game application illustrated above, the interactive device is actually interacting with the display screen automatically, without interference by the user. In the case of the race car game applications, the interaction is quite dynamic: the user interacts with the game application by tilting the tablet computer; the game application interacts with the interactive device by signaling the interactive device (e.g., by displaying a particular light/pixel pattern on the display) when to perform a certain action (e.g., bump, explode, etc.); and the interactive device interacts with the game application by interfacing with the touch sensitive surface (e.g., through conductive bases, etc.). Moreover, it is generally preferred that the interactive devices are not attached to the display screen. However, there are some instances where one might want them attached (such as for the golf game application).

It is still further contemplated that the interactive device could be powered by the light produced by the display screen. For example, the rotors of a model helicopter could be spun by energy captured by the screen with a solar panel under the model helicopter in close proximity with a bright patch of light on the display screen. Alternatively, the interactive device can include a capacitor that stores up the energy from the light of the display screen so that a small motor can release the greater stored energy of the spring or rubber band.

More game application examples that illustrate the inventive subject matter will now be described.

Catapult 1: In this catapult game, a model catapult is attached or set on the edge of the screen. The user can activate the catapult by pulling it back and then pressing a physical button, or just letting the catapult go. The catapult launches small conductive items and the game application detects the location of the conductive item as the conductive item comes in contact with the display screen.

Different games can be designed to interact with the model catapult. For example, a battle ship game can be designed such that the user uses the catapult to attach and sink virtual ships on the display. In another example, the frogs and flies game application can be modified to include this model catapult device. In this example, the user can activate the model catapult to release the frog's tongue (i.e., a piece of conductive material attached to a string so that it can be reeled back in). The model catapult can also be used in a fisherman game in which the user can "cast" the fishing pole using the model catapult device. The end of the fishing pole is attached to a conductive bait. The user can also use the fishing pole to drag the virtual fish to shore. In other sport related games, the user can use the model catapult to swing a conductive baseball or a conductive golf ball.

Catapult 2: Similar to Catapult 1, except that the catapult is placed on the display and is not triggered by the user, but by the game application through the display. The user or users would have to prevent or try to get the catapult to launcher to fire. This could be a competitive game with multiple players, launchers, and possibly multiple tablet computers.

Completing words: This is an educational application that is designed to interact with multiple interactive devices shaped as the twenty-six alphabets. The application generates different words with missing alphabets on the touch-sensitive display. When the user places the correct missing alphabet on the display, the application uses similar techniques as described above to trigger the alphabet to perform a certain action (e.g., jumping around and making noises).

Surgeons: This is another educational application that is designed to interact with different interactive devices shaped as model surgical tools. The application generates imagery that simulates a human body where the user can use the different model surgical tools to operate on the virtual human body. When the user makes a mistake during the procedure (e.g., cut a vital artery by mistake), the application displays lots of blood on the screen and also uses similar techniques as described above to trigger the surgical tool to vibrate.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An interactive toy for interacting with a touch-sensitive electronic display, the interactive toy comprising:
    at least one conductive base, wherein the touch-sensitive electronic display receives a signal from the at least one conductive base indicating location and orientation of the interactive toy when the at least one conductive base is touching the touch-sensitive electronic display;
    an optical sensor, wherein the touch-sensitive electronic display generates information that is transmitted to the optical sensor in response to the signal received from the at least one conductive base;
    an actuator that causes a mechanical interaction between the interactive toy and the touch-sensitive electronic display based on the information transmitted to the optical sensor; and
    wherein the mechanical interaction causes a physical separation of the at least one conductive base from the display or a physical separation of one portion of the toy from another and the display.

2. The interactive toy of claim 1, wherein the signal indicates at least one of the following: a state of the interactive toy, a toy type, a toy make, a toy model, a set of toy features, a toy memory capacity, an interface type, a set of toy capabilities, a revision number, an identity of the interactive toy's owner, an alert, an alarm, and a transaction.

3. The interactive toy of claim 1, wherein the interactive toy generates a non-touch signal indicating the location and the orientation of the interactive toy.

4. The interactive toy of claim 1, wherein the touch-sensitive electronic display is a portion of one of the following: a smart phone, a tablet, a computer, a kiosk, an interactive surface, a game console, an appliance, and an interactive advertisement.

5. The interactive toy of claim 1, wherein the information transmitted to the optical sensor comprises at least one of infrared light and ultraviolet light.

6. The interactive toy of claim 1, wherein the touch-sensitive electronic display displays content comprising at least one of the following: a pixel pattern, a color, a symbol, an object, a temporal display pattern, a pixel location, a set of unlit pixels, and polarization.

7. A method of a toy interacting with an electronic device having a touch-sensitive electronic display, the method comprising:

transmitting to the touch-sensitive electronic display, via at least one conductive base, a signal perceptible to the touch-sensitive electronic display indicating location and orientation of the toy when the at least one conductive base is touching the touch-sensitive electronic display;

receiving, via an optical sensor, information from the touch-sensitive electronic display after receiving the signal from the at least one conductive base; and initiating a mechanical interaction between the toy and the touch-sensitive electronic display based on the information transmitted to the optical sensor;

wherein the mechanical interaction causes a physical separation of the at least one conductive base from the display or a physical separation of one portion of the toy from another and the display.

8. The method of claim 7, wherein the signal indicates at least one of the following: a state of the toy, a toy type, a toy make, a toy model, a set of toy features, a toy memory capacity, an interface type, a set of toy capabilities, a revision number, an identity of the interactive toy's owner, an alert, an alarm, and a transaction.

9. The method of claim 8, further comprising generating a non-touch based registration signal perceptible to the electronic device.

10. The method of claim 8, further comprising configuring the toy to take an action based on the displayed content.

11. The method of claim 8, further comprising receiving a non-optical communication from the display.

12. The method of claim 8, wherein the displayed content comprises at least one of the following: a pixel pattern, a color, a symbol, an object, a temporal display pattern, a pixel location, a set of unlit pixels, and polarization.

13. An interactive toy system for interacting with an electronic device having a display comprising:
a toy body at least partially enclosing a microprocessor, wherein the toy body includes at least one conductive base that is configured to transmit to the touch-sensitive electronic display a signal perceptible to the touch-sensitive electronic display indicating location and orientation of the toy when the at least one conductive base is touching the touch-sensitive electronic display;
wherein the microprocessor is programmed to:
receive, via an optical sensor, information from the touch-sensitive electronic display after receiving the signal from the at least one conductive base; and
initiate a mechanical interaction between the toy and the touch-sensitive electronic display based on the information transmitted to the optical sensor;
wherein the mechanical interaction causes a physical separation of the at least one conductive base from the display or a physical separation of one portion of the toy from another and the display.

14. The interactive toy system of claim 13, wherein the signal indicates at least one of the following: a position of the interactive toy relative to the display, an orientation of the interactive toy relative to the display, a state of the interactive toy, a toy type, a toy make, a toy model, a set of toy features, a toy memory capacity, an interface type, a set of toy capabilities, a revision number, an identity of the interactive toy's owner, an alert, an alarm, and a transaction.

15. The interactive toy system of claim 13, wherein the signal further comprises at least one of the following modalities: a touch modality, an audio modality, a visual modality, a kinesthetic modality, a vibration modality, a temperature modality, and a magnetic modality.

16. The interactive toy system of claim 13, the interactive toy is configured to take an action based on the information from the display.

17. The interactive toy system of claim 16, wherein the action comprises at least one of the following: generating a signal, transacting with another device, communicating with another device, and generating a user interface.

18. The interactive toy system of claim 13, wherein the information from the display comprises at least one of infrared light and ultraviolet light.

19. The interactive toy system of claim 13, wherein the information from the display comprises at least one of the following: a pixel pattern, a color, a symbol, an object, a temporal display pattern, a pixel location, a set of unlit pixels, and polarization.

* * * * *